United States Patent [19]

McIlwain

[11] Patent Number: 5,347,801
[45] Date of Patent: Sep. 20, 1994

[54] ROUND BALER BELT IDLER ROLLER MOUNTING APPARATUS

[75] Inventor: Irwin D. McIlwain, Lancaster, Pa.

[73] Assignee: Ford New Holland, Inc., New Holland, Pa.

[21] Appl. No.: 963,181

[22] Filed: Oct. 19, 1992

[51] Int. Cl.⁵ .................... A01F 15/07; A01F 15/18; F16C 33/78
[52] U.S. Cl. .................................. 56/341; 384/484; 100/89
[58] Field of Search ...................... 56/341; 100/88, 83, 100/89; 384/484

[56] References Cited

U.S. PATENT DOCUMENTS

| | | | |
|---|---|---|---|
| 2,355,805 | 8/1944 | Koepp | 384/484 |
| 2,827,344 | 3/1958 | Maag | 384/484 |
| 2,873,153 | 2/1959 | Haynie | 384/484 |
| 4,870,812 | 10/1989 | Jennings et al. | 56/341 |
| 5,044,272 | 9/1991 | Jennings | 100/89 |

OTHER PUBLICATIONS

Brochure entitled NILOS-Rings, Ziller & Co. (No. 10.000/3.88 RD).

*Primary Examiner*—Stephen J. Novosad
*Attorney, Agent, or Firm*—Frank A. Seemar; Larry W. Miller

[57] ABSTRACT

A round baler having a frame with opposing side walls, conveying apparatus including a series of inwardly facing moving surfaces defining a baling chamber for forming cylindrical bales of crop material and a feeder for feeding crop material into the chamber. Rotatable transverse rollers are mounted between the opposing side walls of the frame for operatively supporting the conveying apparatus, and a journal assembly having a bearing arrangement for mounting the rollers. The bearing arrangement includes a generally cylindrical stationary first race and a concentrically disposed generally cylindrical rotatable second race between which races a bearing cavity is formed for seating a series of bearings housed between said first and second races. A unique shield assembly encloses the cavity and prevents the intrusion of unwanted debris.

11 Claims, 2 Drawing Sheets

ROUND BALER BELT IDLER ROLLER MOUNTING APPARATUS

BACKGROUND OF THE INVENTION

This invention relates generally to a baler for forming cylindrical bales of crop material, commonly referred to as a round baler. More particularly, this invention is directed to improved mounting apparatus for the belt idler rollers on round balers using belts in the formation of bales.

Prior art balers of this type generally have a bale forming chamber defined by an apron comprising an array of side-by-side belts, transverse slats extending between chains, a plurality of bale forming rolls or a combination of these various elements, e.g., bale forming rolls and side-by-side belts. U.S. Pat. No. 5,044,272 issued Sep. 3, 1991 to Richard E. Jennings shows the joint use of rolls and belts to form a chamber.

During field operation of round balers, crop material, such as hay, is picked up from the ground and fed into a fixed or adjustable chamber where it is rolled up to form a compact cylindrical package of hay. While still in the bale forming chamber the formed package is wrapped in its compacted form by net, twine or the like, prior to being ejected as a bale from the baler onto the ground for subsequent handling.

Round balers of the general type mentioned above comprising a chamber defined at least partially by a plurality of side-by-side, longitudinally extending belts supported on a plurality of transverse rollers have encountered problems of varying degree when stray crop material and other debris, such as dirt and dust, finds its way into the mounting bearings for the transverse rollers. These problems become especially acute when the material being baled is damp, and particularly if it is a short cut of grass crop. Field experience has shown that standard bearing seals are not sufficient to prevent the fine random debris from working its way into the bearing cavity. Eventually, if permitted to go uncorrected, serious wear problems may occur culminating in bearing failure. Of particular concern is bearing failure that generates excessive frictional heat which gives rise to the danger of igniting a fire in extremely dry conditions.

A number of known prior attempts to reduce or overcome this problem have been unsuccessful. In this regard, various commercially available metallic shields adapted to be mounted in the vicinity of the bearing cavity have been tried. An example of these shields is the axial ring sold by Ziller and Company of West Germany under the registered trademark NILOS. After continuous use of this type of shield in the baler environment described above the bearing cavity became contaminated with unwanted debris.

In another unsuccessful attempt to maintain the integrity of the bearing cavity a pliable washer was fabricated from a fiber material having the consistency of leather. Here again after continuous use in the field environment described above the seal broke down and unwanted debris entered the bearing cavity with the same detrimental affect on the operation of the roller mounting assembly.

Although previously known shielding arrangements for preventing debris from entering the bearing cavity in round baler roller mounting assemblies have met with varying degrees of success, failure continues to occur. At the heart of the problem is the environment in which these mounting assemblies are being used. Regardless of initial sealing characteristics when the shields are installed, after the rigors of continuous use in dirty and damp conditions unwanted debris works past the prior art shielding devices and ultimately penetrates the bearing seal causing bearing to seize up and fail. Thus, integrity of the debris shield over long periods of use is an important aspect of reliable round baler performance to which the present invention is devoted.

SUMMARY OF THE INVENTION

An important object of the present invention is to provide improved roller mounting apparatus for a round baler to enhance the reliability and thereby improve its overall performance by reducing or eliminating the incidence of failure caused by the entry of unwanted debris into the bearing cavity.

In pursuance of this and other important objects the present invention provides for new and unique improvements to round baler apparatus having a frame with opposing side walls, conveying means with a series of inwardly facing moving surfaces defining a baling chamber for forming cylindrical bales of crop material, means for feeding crop material into the chamber, rotatable transverse rollers mounted between the opposing side walls of the frame for operatively supporting the conveying means, and journal means having a bearing assembly for mounting the rollers. The bearing assembly includes a generally cylindrical stationary first race and a concentrically disposed generally cylindrical rotatable second race between which races a bearing cavity is formed for seating a series of bearings housed between the first and second races, the second race being rotatable relative to the first race. More particularly, the present invention contemplates the use of a generally ring shaped shield for sealing the cavity in a manner not heretofore envisioned, resulting in unexpected consequences. The shield has a first edge in contact with the second race. Resilient means bear against the ring shaped shield in a generally axial direction to maintain continuous contact between the first edge and the second race to seal the bearing cavity and thereby prevent the entry of unwanted debris.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
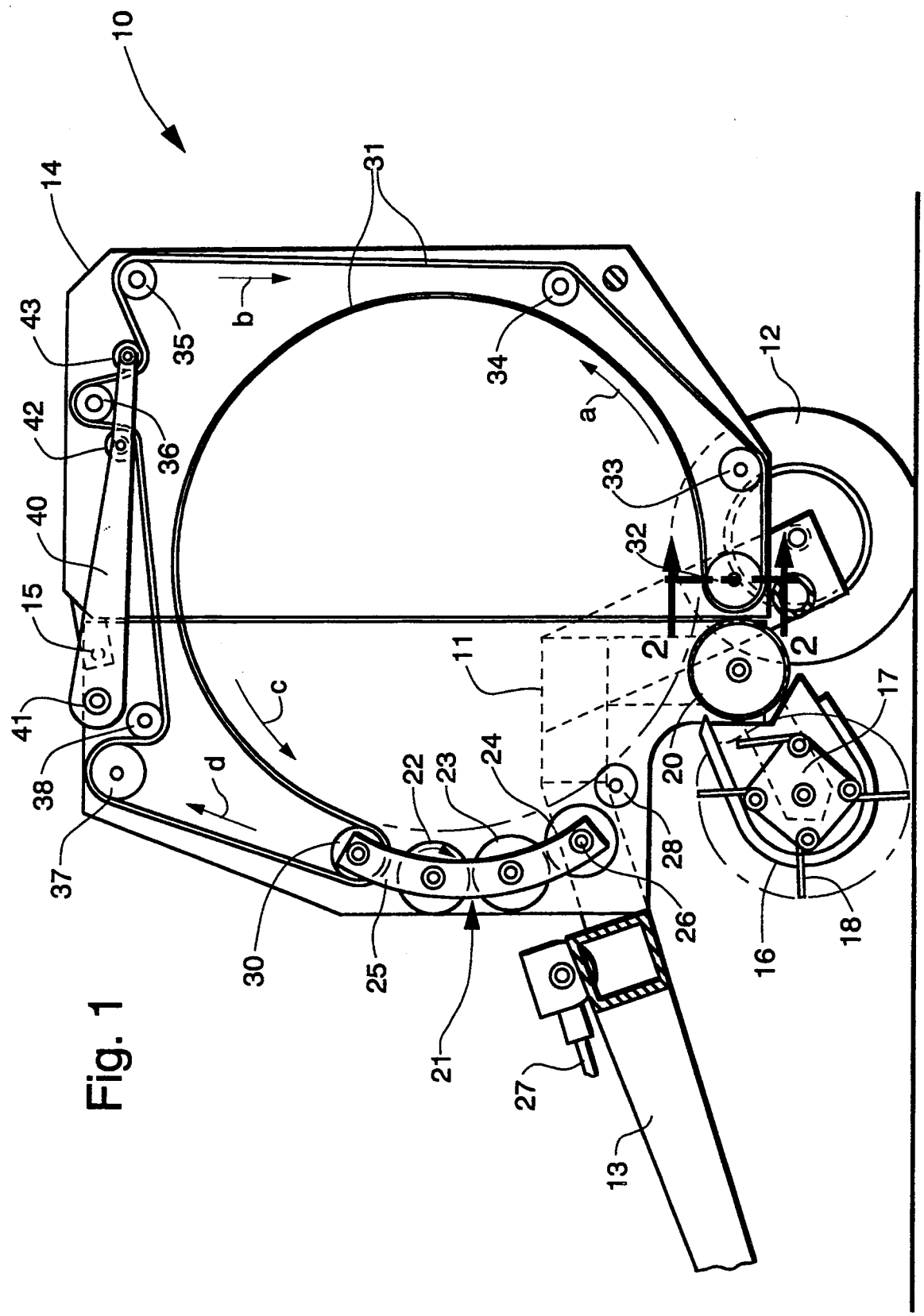
FIG. 1 is a diagrammatic side elevational view of a round baler in which the present invention is embodied.

Referring now to the drawings for a more detailed description of the preferred embodiment of the invention, FIG. 1 shows an expandable chamber round baler 10 of the type disclosed in detail in U.S. Pat. No. 4,870,812 issued on Oct. 3, 1989 in the name of R. E. Jennings et al. It includes a main frame 11 supported by a pair of wheels 12 (only one shown). A tongue 13 is provided on the forward portion of main frame 11 for connection to a tractor (not shown). A tailgate 14 is pivotally connected to main frame 11 by stub shaft 15 and a similar opposing stub shaft (not shown) so that tailgate 14 may be pivoted from the closed position shown in FIG. 1 to an opened position shown and described in the Jennings et al patent mentioned above. A conventional pickup 16 is mounted on main frame 11 by a pair of brackets 17 (only one shown) and is supported in a well known manner by a pair of wheels (not shown). The pickup 16 includes a plurality of fingers or tines 18 moveable in a predetermined path (shown in phantom outline) to lift crop material from the ground and deliver it rearwardly toward a floor roll 20 which is rotatably mounted on main frame 11.

In accordance with the baler shown in FIG. 1 in which the present invention is embodied, a sledge assembly 21 includes a plurality of rollers 22, 23, 24 extending transversely of main frame 11 in an arcuate arrangement and journalled at the ends thereof in a pair of arcuately shaped opposing arms 25, only one of which is shown. Arms 25 are pivotally mounted inside main frame 11 on a pair of stub shafts 26 (only one shown) for permitting movement of sledge assembly 21 between a bale starting position, shown and described in Jennings et al, and a full bale position shown in FIG. 1. Rollers 22, 23, 24 are driven in a clockwise direction as indicated in FIG. 1, by conventional means (for example, chains and sprockets or gears) connected with a drive shaft 27 which is adapted for connection to the PTO of a tractor. A starter roll 28 is located adjacent roller 24 and is also driven in a clockwise direction, as viewed in FIG. 1, to enhance core starting and to strip crop material from roller 24. An idler roller 30 is carried by arms 25 for movement in an arcuate path when sledge assembly 21 moves between the bale starting position (not shown) and the full bale position (shown in FIG. 1). Idler roller 30 is freely rotatable.

An apron comprises a plurality of conventional side-by-side belts 31 supported on guide rolls 32, 33, 34, 35, 36 which are rotatably mounted in tailgate 14 and on a drive roll 37 which is rotatably mounted in main frame 11. Although the belts 31 pass between sledge roller 22 and idler roller 30, they are only in engagement with idler roller 30, while roller 22, due to being located in close proximity to belts 31, strips crop material from belts 31. Further conventional means ( not shown ) are connected with drive shaft 27 to provide rotation of drive roll 37 in a direction which causes movement of belts 31 in the direction indicated by arrows a, b, c and d along the path shown in FIG. 1, the inner course of which is designated by arrows a and c. An additional guide roll 38 in main frame 11 ensures proper driving engagement between belts 31 and drive roll 37. Another pair of arms 40 (one shown) are pivotally mounted on main frame 11 by a cross shaft 41 for movement during bale formation between inner and outer positions, the outer full bale position being shown in FIG. 1. Arms 40 carry additional guide rolls 42 and 43 for guiding belts 31. Resilient means (not shown) are provided to normally urge arms 40 toward their inner positions while resisting movement thereof to their full bale outer positions. A complete description of bale formation in baler 10 is provided in the Jennings et al patent, referred to above.

For the purpose of the present invention, it should be understood that as round baler 10 is towed across a field by a tractor, pickup tines 18 lift crop material from the ground and feed it into the bale forming chamber via a throat defined by roller 28 spaced from floor roller 20. The crop material is conveyed by floor roll 20 into engagement with a series of inwardly facing moving surfaces comprising the inner course of the apron and rollers 22, 23, 24 and 28, whereby it is coiled in a counterclock-wise direction (as viewed in FIG. 1) to form a bale. During such formation, continued feeding of crop material into the chamber by pickup tines 18 causes the apron belts 31 to expand until arms 40 rotate to their outer position shown in FIG. 1. When a full size package of crop material has been so formed, it is then wrapped with a suitable material, such as twine or net, tailgate 14 is opened by conventional means (for example, hydraulic cylinders) and a completed bale is ejected. Subsequent closing of tailgate 14 returns apron belts 31 to their initial position (not shown) and round baler 10 is again ready to form another bale.

Figure 2:
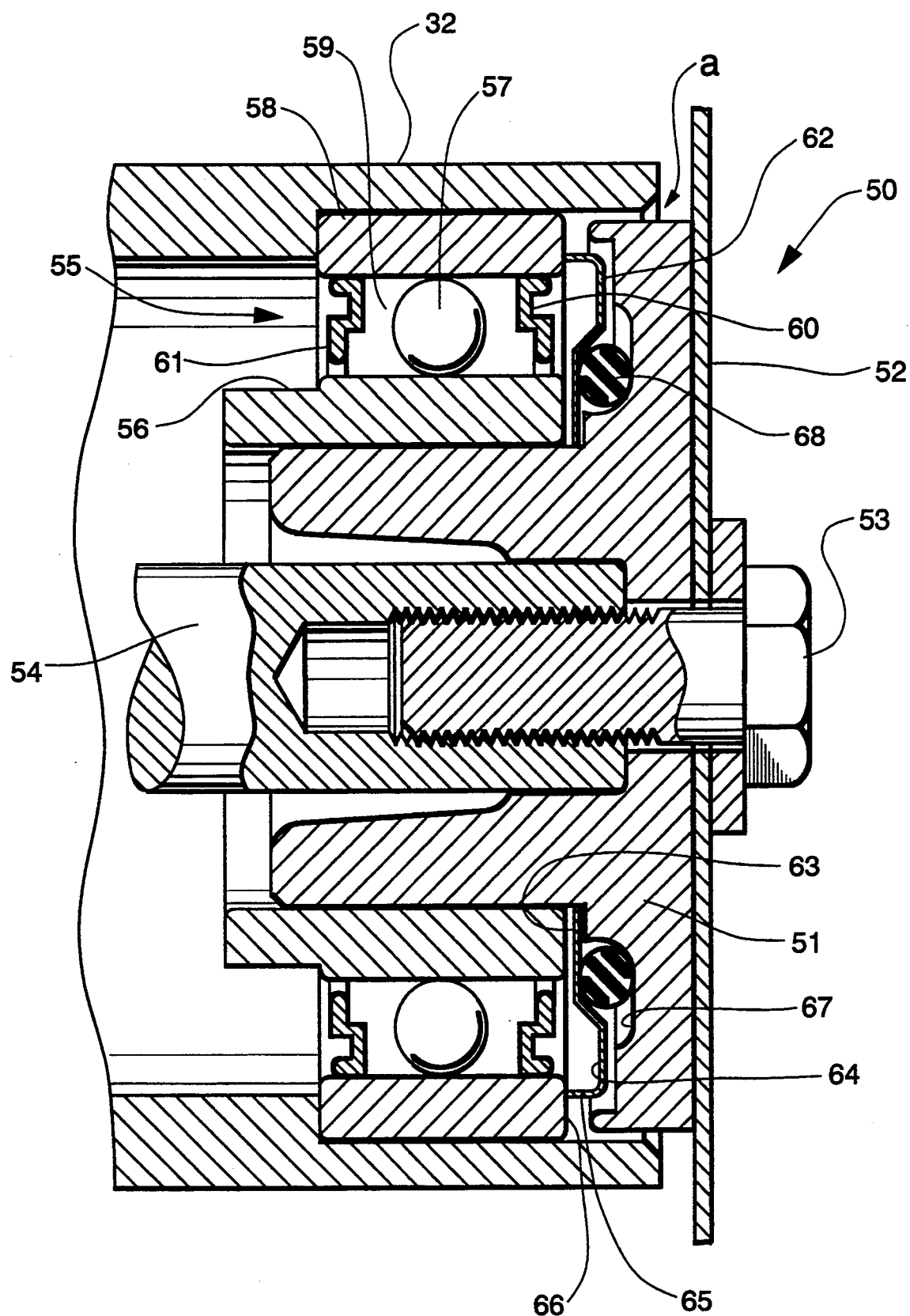
FIG. 2 is a view taken in the direction of arrows 2—2 in FIG. 1 and shows the improved structure of the present invention.

Now turning to the idler roller mounting apparatus of the present invention, it will be understood in light of the prior art and the above description that during formation of a bale the hay is agitated and churned and in some instances, especially in certain crop types and conditions, debris has a tendency to pass through the spaces between the belts as well as the space between end walls of the baler and the adjacent end belts in the vicinity of the mounting apparatus in which the various idler rolls are journalled. To this end, improved idler roller mounting apparatus 50 is shown in FIG. 2 for use in conjunction with idler roll 32 mounted between the sidewalls of the tail gate of round baler 10. A similar assembly has been successfully used in conjunction with other idler rolls where the problem of bearing failure has also had a tendency to occur in the past, such as, for example, idler roll 30 mounted on sledge assembly 21 (see FIG. 1) or guide roll 38 mounted between the fixed sidewalls of the baler.

Now turning to FIG. 2, idler roller apparatus 50 more specifically comprises a bearing support 51 affixed to side wall 52 of tail gate 14 by means of a mounting bolt 53 attached via a threaded recess to a tie rod 54. Concentrically mounted on bearing support 51 is a bearing assembly 55 operatively affixed to the end portion of idler roll 32, also concentric with bearing support 51. Tie rod 54 and idler roll 32 extend to the opposing side wall at which similar idler roller mounting apparatus is provided.

Bearing assembly 55 includes an outer rotatable race 58 and an inner fixed race 56 between which a series of spherical balls 57 are appropriately disposed for operation in recesses in a conventional manner. Bearings 57 are enclosed in a bearing cavity by opposing conventional bearing seals 60, 61. For the purposes of this invention the bearings could be of any other known type such as, for example, roller bearings. Also, without departing from the purpose of this invention, the outer race could be fixed with the inner race adapted for rotation relative thereto in conjunction with the idler roller 32.

A ring shaped shield 62 is disposed axially outwardly of the right end (as shown in FIG. 2) of bearing cavity 59 and generally adjacent the outer conventional bearing seal 60. Shield 62 is fabricated from a rigid material and comprises inner and outer flat body portions 63, 64, respectively, extending in parallel planes with portion 63 being disposed in a plane inwardly with respect to portion 64 and thereby in close relationship to the outer end of inner race 56 of bearing assembly 55. Outer body portion 64 is integral with a flange portion 65 that terminates in a circular edge that bears against the outer end surface 66 of rotatable outer race 58.

An annular shaped recess 67 is disposed in bearing support 51 to accommodate a flexible O-ring 68 which is compressed against ring shaped shield 62 to exert a axial force. O-ring 68 is fabricated from rubber in the preferred embodiment but could be fabricated from any similar material or it could also be a metal spring or any other equivalent substitute. The resiliency of ring 68 is such that an axial force is applied regardless of slight variations in the axial position of shield 62 caused by wear-in grooving of outer end surface 66 of outer race 58, and regardless of mounting position tolerances of the various elements or slight wear on the edge of the shield. The rigidity of shield 62 is such that the spacing between inner race 56 and inner flat body portion 63 is maintained notwithstanding the amount of axial force exerted by ring 68.

In operation, idler roll 32 accommodates belts 31 (see FIG. 1) during bale formation at which time the aforementioned debris is prevalent in various crop conditions. Conventional bearing seals 60, 61 seal the bearings to some degree but have not been adequate to keep bearing cavity 59 free of contamination under the field conditions mentioned above. Debris works its way between roll 32 and bearing support 51 at "a" and without applicant's unique shield arrangement it is permitted to pass between the seal and the moving surface of the bearing race. This path is interrupted by shield 62 and the critical area of contact between the edge of the flange portion 65 and the rotating outer end surface 66 is maintained regardless of wear.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention. For example, although the preferred embodiment of the invention is incorporated in a round baler in which the chamber is defined by a series of belts and rolls, it is contemplated that any type of round baler, regardless of chamber defining means, whether an expandable or non-expandable chamber, could be encompassed by the principles of this invention.

Having thus described the invention, what is claimed is:

1. In a round baler having a frame with opposing side walls; conveying means including a series of inwardly facing moving surfaces defining a baling chamber for forming cylindrical bales of crop material, means for feeding crop material into said chamber, rotatable transverse rollers mounted between said opposing side walls of said frame for operatively supporting said conveying means, and journal means having a bearing assembly for mounting at least one of said rollers, said bearing assembly including a generally cylindrical stationary first race and a concentrically disposed generally cylindrical rotatable second race between which races a bearing cavity is formed for seating a series of bearings housed between said first and second races, and said second race rotatable relative to said first race, the improvement comprising a generally ring shaped shield enclosing said cavity,
said generally ring shaped shield includes a first edge in contact with said second race,
said generally ring shaped shield further includes a coaxially disposed flange portion terminating at said edge, and
resilient means urges said shield in a generally axial direction to maintain continuous contact between said first edge and said second race.

2. In a round baler as set forth in claim 1 wherein said generally ring shaped shield comprises a first flat portion and a rigidly interconnected second flat portion disposed in a plane perpendicular to said at least one of said rollers and parallel to the plane in which said first flat portion is disposed.

3. In a round baler as set forth in claim 2 wherein said resilient means bears against said first flat portion of said generally ring shaped shield.

4. In a round baler as set forth in claim 3 wherein said journal means further comprise bearing support means to which said stationary race is affixed, said support means having an annular recess facing said generally ring shaped shield and said resilient means is enclosed within said annular recess.

5. In a round baler as set forth in claim 4 wherein said resilient means is an O-ring.

6. In a round baler having a frame with opposing side walls, conveying means including a series of inwardly facing moving surfaces defining a baling chamber for forming cylindrical bales of crop material, means for feeding crop material into said chamber, rotatable transverse rollers mounted between said opposing side walls of said frame for operatively supporting said conveying means, and journal means having a bearing assembly for mounting at least one of said rollers, said bearing assembly including a generally cylindrical stationary first race and a concentrically disposed generally cylindrical rotatable second race between which races a bearing cavity is formed for seating a series of bearings housed between said first and second races, and said second race rotatable relative to said first race, the improvement comprising a generally ring shaped shield enclosing said cavity,
said generally ring shaped shield includes a first edge in contact with said second race,
said generally stationary first race is mounted inwardly of said generally cylindrical rotatable second race, and
resilient means urges said shield in a generally axial direction to maintain continuous contact between said first edge and said second race.

7. In a round baler as set forth in claim 6 wherein said generally ring shaped shield includes a coaxially disposed flange portion terminating at said edge.

8. In a round baler as set forth in claim 7 wherein said generally ring shaped shield comprises a first flat portion and a rigidly interconnected second flat portion disposed in a plane perpendicular to said at least one of said rollers and parallel to the plane in which said first flat portion is disposed.

9. In a round baler as set forth in claim 8 wherein said resilient means bears against said first flat portion of said generally ring shaped shield.

10. In a round baler as set forth in claim 9 wherein said journal means further comprise bearing support means to which said stationary race is affixed, said support means having an annular recess facing said generally ring shaped shield and said resilient means is enclosed within said annular recess.

11. In a round baler as set forth in claim 10 wherein said resilient means is an O-ring.

* * * * *